United States Patent
Hall

(10) Patent No.: US 9,210,404 B2
(45) Date of Patent: Dec. 8, 2015

(54) CALIBRATION AND REGISTRATION OF CAMERA ARRAYS USING A SINGLE CIRCULAR GRID OPTICAL TARGET

(71) Applicant: Microsoft Corporation, Redmond, WA (US)

(72) Inventor: Michael Hall, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 439 days.

(21) Appl. No.: 13/715,723

(22) Filed: Dec. 14, 2012

(65) Prior Publication Data

US 2014/0168378 A1   Jun. 19, 2014

(51) Int. Cl.
| | |
|---|---|
| H04N 5/247 | (2006.01) |
| H04N 13/02 | (2006.01) |
| G06F 3/01 | (2006.01) |
| G06F 3/042 | (2006.01) |
| G06T 7/00 | (2006.01) |

(52) U.S. Cl.
CPC ............ *H04N 13/0246* (2013.01); *G06F 3/017* (2013.01); *G06F 3/0425* (2013.01); *G06T 7/0018* (2013.01); *H04N 13/0253* (2013.01); *H04N 13/0257* (2013.01); *H04N 13/0271* (2013.01); *G06T 2207/10024* (2013.01); *G06T 2207/10028* (2013.01); *G06T 2207/30208* (2013.01)

(58) Field of Classification Search
CPC ............ G06T 2207/3028; G06T 2207/10021; G06T 2207/10024; G06T 2207/10028; G06T 7/0018; G06T 7/2093; H04N 13/0242; H04N 13/0246; H04N 13/0271
See application file for complete search history.

(56) References Cited

U.S. PATENT DOCUMENTS 5,852,672 A * 12/1998 Lu ................................. 382/154
6,591,011 B1 * 7/2003 Nielsen ......................... 382/218
(Continued)

FOREIGN PATENT DOCUMENTS

EP  1378790 A2  1/2004

OTHER PUBLICATIONS

"International Search Report & Written Opinion for PCT Application No. PCT/US2013/075206", Mailed Date: Feb. 10, 2014, Filed Date: Dec. 14, 2013, 10 pages.
D. Herrera C., et al., "Joint Depth and Color Camera Calibration with Distortion Correction", Retrieved on: Aug. 14, 2012, Available at: http://www.ee.oulu.fi/~dherrera/papers/2012-KinectJournal.pdf.
Zhang, et al., "Calibration Between Depth and Color Sensors for Commodity Depth Cameras", Retrieved on: Aug. 14, 2012, Available at: http://research.microsoft.com/en-us/um/people/chazhang/publications/hot3d11_chazhang.pdf.
(Continued)

*Primary Examiner* — Huy T Nguyen
(74) *Attorney, Agent, or Firm* — Gregg Wisdom; Judy Yee; Micky Minhas

(57) ABSTRACT

Methods for determining intrinsic parameters associated with a camera and for registering cameras within a camera array are described. In some embodiments, a camera may be calibrated using an optical target that is positioned at a depth outside the depth of focus of the camera. The optical target may include a grid of symmetrical shapes (e.g., a rectilinear grid of circles or tilted squares). The intrinsic parameters for the camera may be determined using an iterative calibration process in which a cost function is used to evaluate the straightness of lines intersecting rows and columns associated with centroids of the symmetrical shapes. In some embodiments, the registration of a color camera with a depth camera may include mapping centroids identified within a first color image captured by the color camera with corresponding centroids identified within an undistorted intensity image captured by the depth camera.

18 Claims, 14 Drawing Sheets

(56) References Cited

U.S. PATENT DOCUMENTS

| | | |
|---|---|---|
| 6,816,187 B1 | 11/2004 | Iwai et al. |
| 7,015,954 B1 | 3/2006 | Foote et al. |
| 7,899,270 B2 | 3/2011 | Kim et al. |
| 8,290,246 B1 | 10/2012 | Schairer et al. |
| 2005/0185049 A1* | 8/2005 | Iwai et al. .................. 348/47 |
| 2007/0104361 A1 | 5/2007 | Alexander |
| 2007/0122014 A1 | 5/2007 | Sato |
| 2011/0317005 A1 | 12/2011 | Atkinson |

OTHER PUBLICATIONS

Burrus, Nicolas, "Kinect Calibration", Published on: Aug. 7, 2011, Available at: http://nicolas.burrus.name/index.php/Research/KinectCalibration.

* cited by examiner

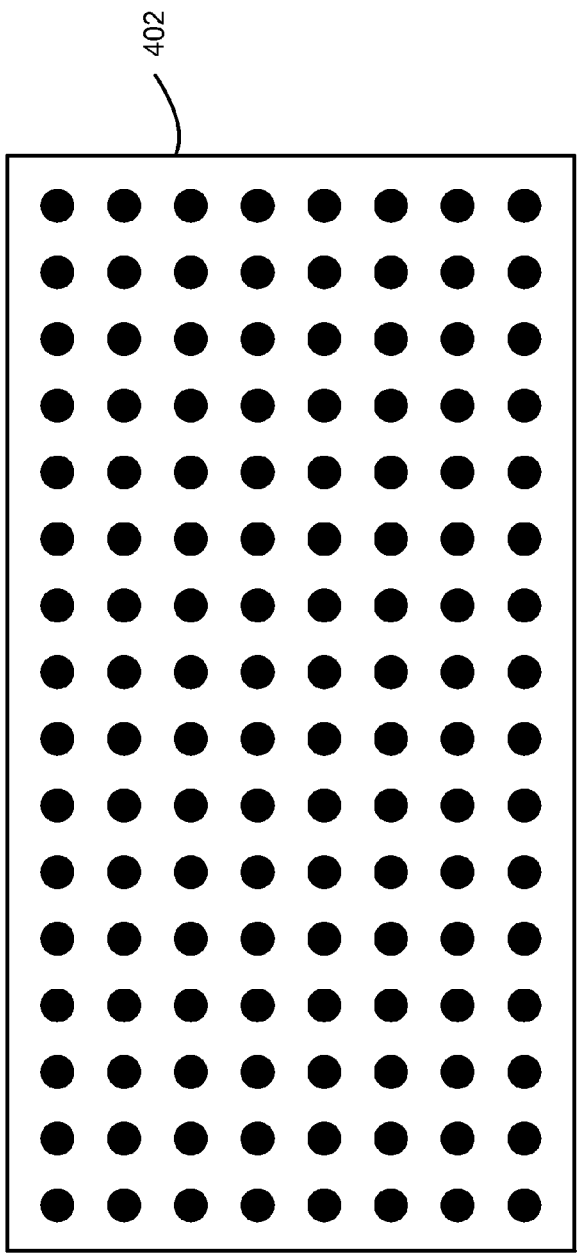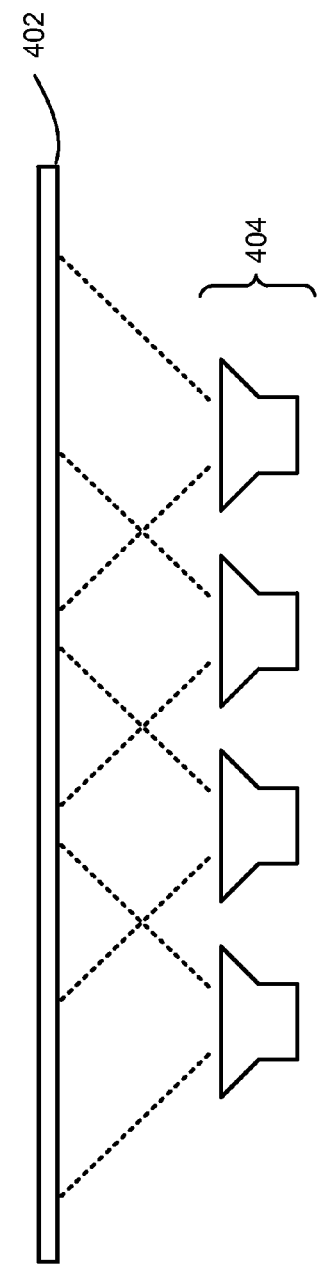
FIG. 4A
FIG. 4B

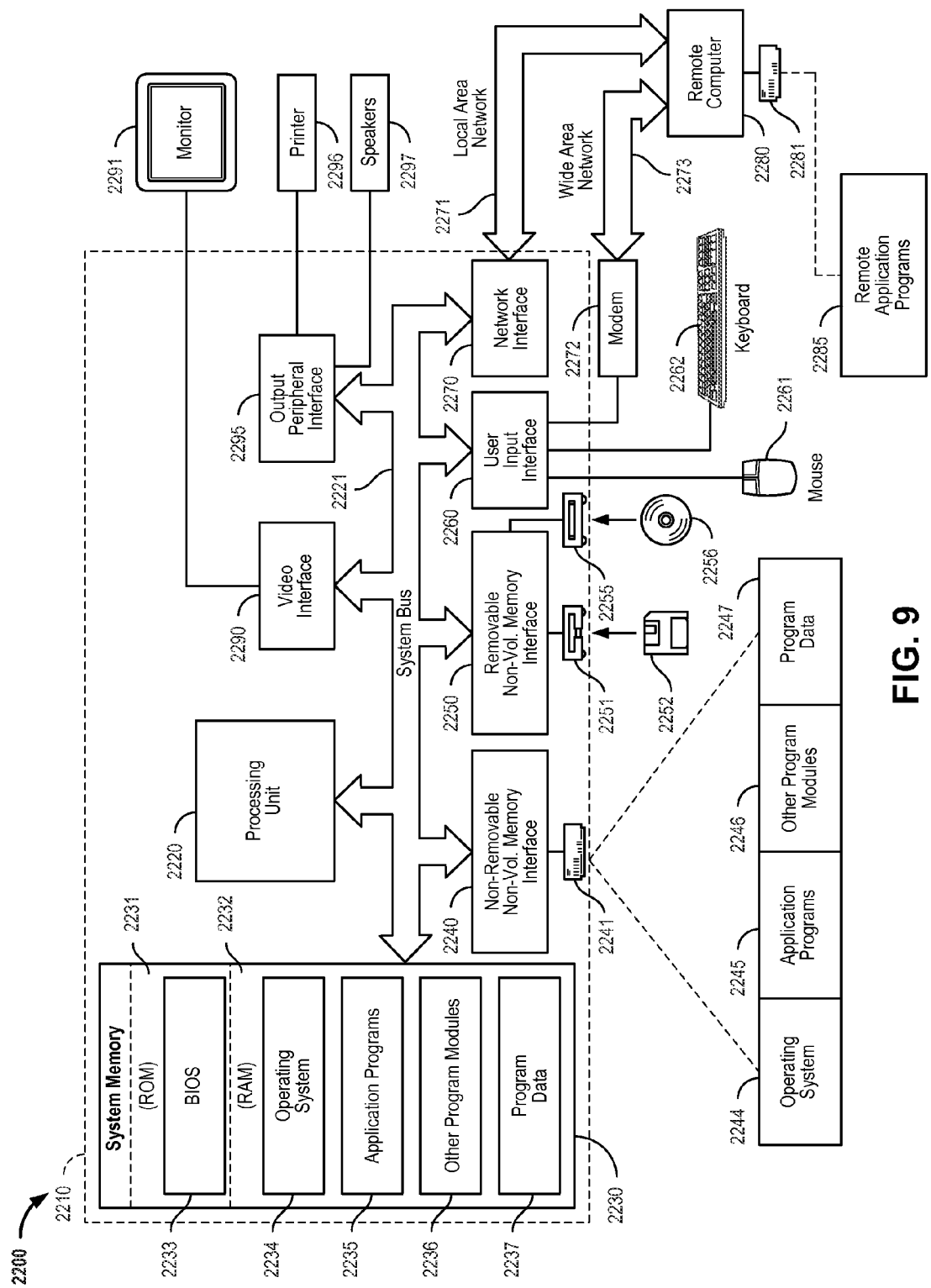

CALIBRATION AND REGISTRATION OF CAMERA ARRAYS USING A SINGLE CIRCULAR GRID OPTICAL TARGET

BACKGROUND

Some home entertainment and gaming systems provide a natural user interface in which a system may be controlled using gestures or spoken commands. These systems may include a color camera (e.g., an RGB camera) and depth camera pair for capturing images of a scene, such as a playspace, in order to sense motion and identify gestures. The depth camera may comprise an active illumination depth camera that utilizes time-of-flight (TOF) or structured light techniques for obtaining depth information. The color camera may capture the scene as a color image and the depth camera may capture the scene as a depth map. A depth map may comprise a two-dimensional image of an environment that includes depth information relating to the distances to objects within the environment from a particular reference point, such as a point associated with the depth camera. Each pixel in the two-dimensional image may be associated with a depth value representing a linear distance from the particular reference point.

Various computer vision techniques including gesture recognition, object recognition, 3D scene reconstruction, and image based rendering may register (or align) color information from a color image with depth information from a depth map. The registration of a color camera with a depth camera may include determining the relative pose between the two cameras using a planar checkerboard pattern placed within an environment as an optical target for aligning feature points. As the depth camera may simultaneously produce an intensity image (e.g., an IR light intensity image) and a depth map, the registration process may include mapping features points based on color discontinuities within the intensity image.

SUMMARY

Technology is described for determining intrinsic parameters associated with a camera and for registering cameras within a camera array. In some embodiments, a camera may be calibrated using an optical target that is positioned at a depth outside of the depth of focus of the camera. The optical target may include a grid of symmetrical shapes (e.g., a rectilinear grid of circles or tilted squares). The intrinsic parameters for the camera may be determined using an iterative calibration process in which a cost function is used to evaluate the straightness of lines intersecting rows and columns associated with centroids of the symmetrical shapes. In some embodiments, the registration of a color camera with a depth camera may include mapping centroids identified within a first color image captured by the color camera with corresponding centroids identified within an undistorted intensity image captured by the depth camera.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 4A-4B depict one embodiment of an arrangement for calibrating and/or registering a plurality of cameras using a single optical target.

FIG. 9 is a block diagram of an embodiment of a computing system environment.

DETAILED DESCRIPTION

Figure 1:
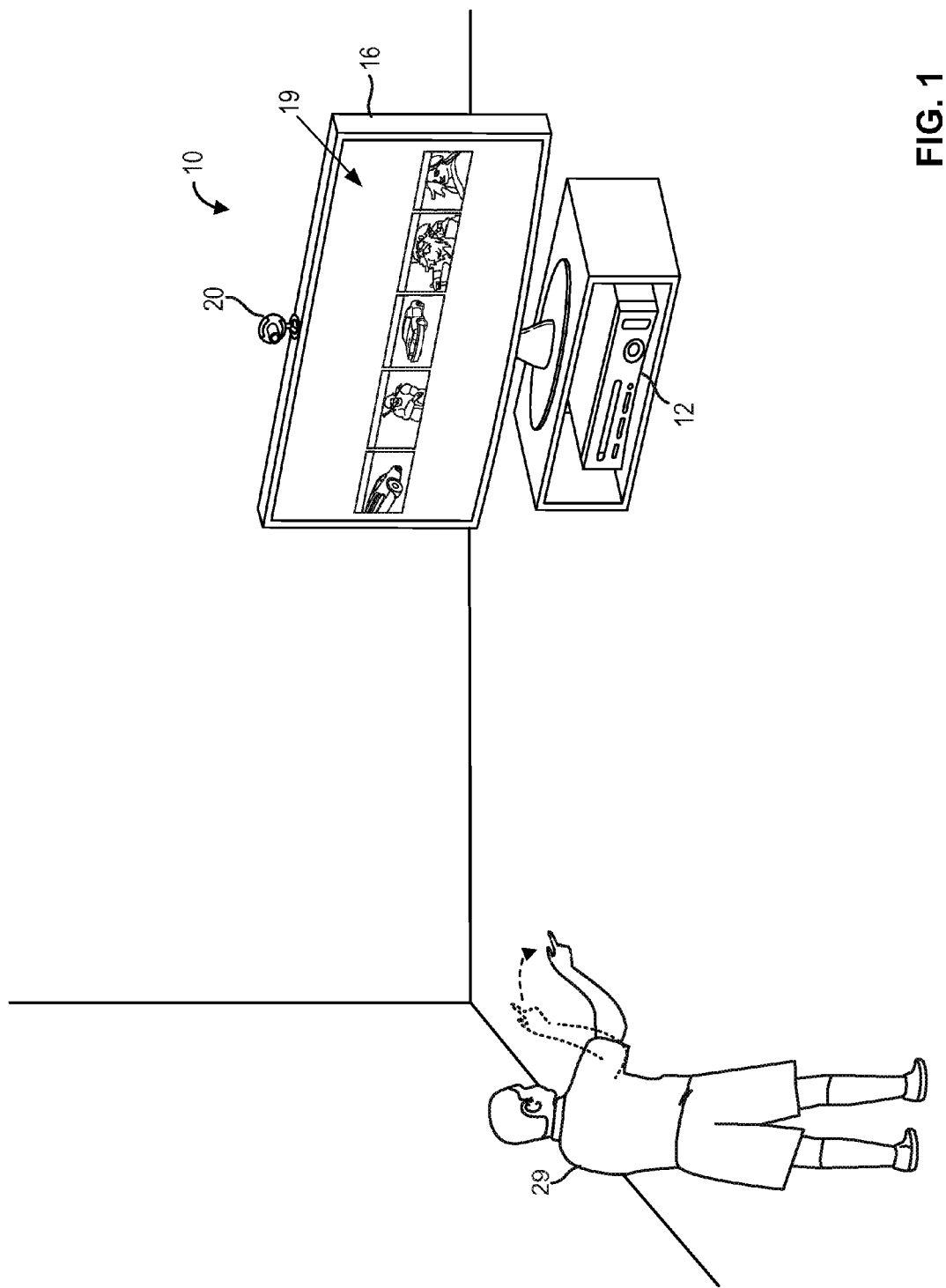
FIG. 1 depicts one embodiment of an interactive computing system that includes a natural user interface.

Technology is described for determining intrinsic parameters associated with a camera and for registering two or more cameras within a camera array. In some embodiments, a camera may be calibrated using an optical target that is positioned at a depth outside (or well outside) the depth of focus of the camera. The optical target may include a grid of symmetrical shapes (e.g., a rectilinear grid of circles, a rectilinear grid of tilted squares, a non-rectilinear grid of circles, or a non-rectilinear grid of tilted squares). As a symmetrical shape of the optical target may not be in focus, a location associated with the symmetrical shape may be obtained by determining the symmetrical shape's centroid (or geometric center). The intrinsic parameters for the camera may be determined using an iterative calibration process. The intrinsic parameters may include focal length, principal point, camera rotation parameters, and camera distortion parameters. The camera distortion parameters may include radial distortion parameters and/or tangential distortion parameters. The distortion parameters may be determined by optimizing one or more distortion equations (e.g., an even-order radial distortion polynomial). The optimization may utilize a cost function that evaluates the straightness of lines intersecting rows and columns associated with centroids of the symmetrical shapes. The principal point may correspond with the center of distortion.

In some embodiments, the registration of a color camera (e.g., an RGB camera) with a depth camera may include calibrating the depth camera and/or color camera to correct for distortions associated with each separately and then determining a registration mapping for mapping feature points (e.g., centroids) identified within a first color image captured by the color camera with corresponding feature points identified within an undistorted intensity image captured by the depth camera. In some cases, a single optical target including fiducial markers (e.g., symmetrical shapes of varying colors, shapes, or sizes) may be used to calibrate and register a camera array including a plurality of cameras with overlapping field of views. In some embodiments, evaluation of various camera lens characteristics (e.g., that a camera lens or optical system meets certain intrinsic parameter requirements) and evaluation of manufacturing errors occurring during lens fabrication may be performed using the technology disclosed herein.

One issue involving the calibration and registration of a camera array is that the registration may require capturing many different images of an optical target from many different orientations which may increase the time and expense of calibrating and registering the camera array. Moreover, the amount of space on a production floor necessary to perform the calibration and registration of a camera array may be set based on the distance to the optical target necessary to place features of the optical target (e.g., the crossings of a checkerboard target) in focus. Thus, there is a need to reduce the time, expense, and amount of space involved with the calibration and registration of cameras within a camera array.

FIG. 1 depicts one embodiment of an interactive computing system 10 that includes a natural user interface. The interactive computing system 10 may include a computing environment 12, a capture device 20, and a display 16, all in communication with each other. Computing environment 12 may include one or more processors. Capture device 20 may include one or more color cameras and/or one or more depth sensing cameras that may be used to visually monitor one or more targets including humans and other real objects within a particular environment. Capture device 20 may also include a microphone. In one example, capture device 20 may include a color camera, a depth sensing camera, and a microphone and computing environment 12 may comprise a gaming console.

In some embodiments, the capture device 20 may include an active illumination depth camera, which may use a variety of techniques in order to generate a depth map of an environment or to otherwise obtain depth information associated the environment including the distances to objects within the environment from a particular reference point. The techniques for generating depth information may include structured light illumination techniques and time of flight (TOF) techniques.

Structured light illumination involves projecting a light pattern into an environment, capturing an image of the reflected light pattern, and then determining distance information from the spacings and/or distortions associated with the reflected light pattern relative to the projected light pattern. The light may include optical radiation including visible light, infrared (IR) light, and ultraviolet (UV) light. The light pattern may be projected using light that is invisible to the naked eye (e.g., IR or UV light) and may comprise a single dot, a single line, or a variety of dimensional patterns (e.g., horizontal and vertical lines, or checkerboard patterns). In some cases, several different light patterns may be necessary to generate accurate depth information.

Time of flight techniques may determine distances to objects within an environment by timing how long it takes for light transmitted from a light source to travel to the objects and reflect back to an image sensor or camera. In some cases, a short light pulse (or series of light pulses) may be projected into the environment at a first point in time and reflections associated with the short light pulse may be captured at a second point in time after the first point in time. A time of flight system may adjust the time difference between the first point in time and the second point in time in order to detect objects at a particular distance (or over a range of distances) associated with the time difference.

As depicted, an end user 29 of the interactive computing system 10 may control a user interface 19 displayed on display 16 using gestures. A gesture may comprise a motion or pose by the user that may be captured as image data and parsed for meaning. A gesture may be dynamic, comprising a motion, such as mimicking throwing a ball. A gesture may be a static pose, such as holding one's forearms crossed. A gesture may also incorporate props, such as swinging a mock sword.

Capture device 20 may capture image and audio data relating to one or more users and/or objects within an environment. For example, capture device 20 may be used to capture information relating to partial or full body movements, gestures, and speech of one or more users. The information captured by capture device 20 may be received by computing environment 12 and/or a processing element within capture device 20 and used to render, interact with, and control aspects of a gaming or other application. In one example, capture device 20 may capture image and audio data relating to a particular user and computing environment 12 processes the captured information to identify the particular user by executing facial and voice recognition software and to identify a particular gesture performed by the particular user. In one embodiment, an end user's movements may be used to control various aspects of an operating system and/or computing application running on the computing environment 12.

The computing environment 12 may be connected to a display 16 (or other audiovisual device), which may comprise a television, a monitor, or a high-definition television (HDTV) for providing application related visuals and/or audio to the end user 29. In one example, the display 16 may receive audiovisual signals from the computing environment 12 and may output or display application visuals (e.g., gaming graphics) to the end user 29 based on the audiovisual signals.

Some examples of an interactive computing system 10 and components thereof may be found in the following patent applications, all of which are herein incorporated by reference in their entirety: U.S. patent application Ser. No. 12/475,094, entitled "Environment And/Or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; U.S. patent application Ser. No. 12/391,150, entitled "Standard Gestures," filed Feb. 23, 2009; and U.S. patent application Ser. No. 12/474,655, entitled "Gesture Tool," filed May 29, 2009.

Figure 2:
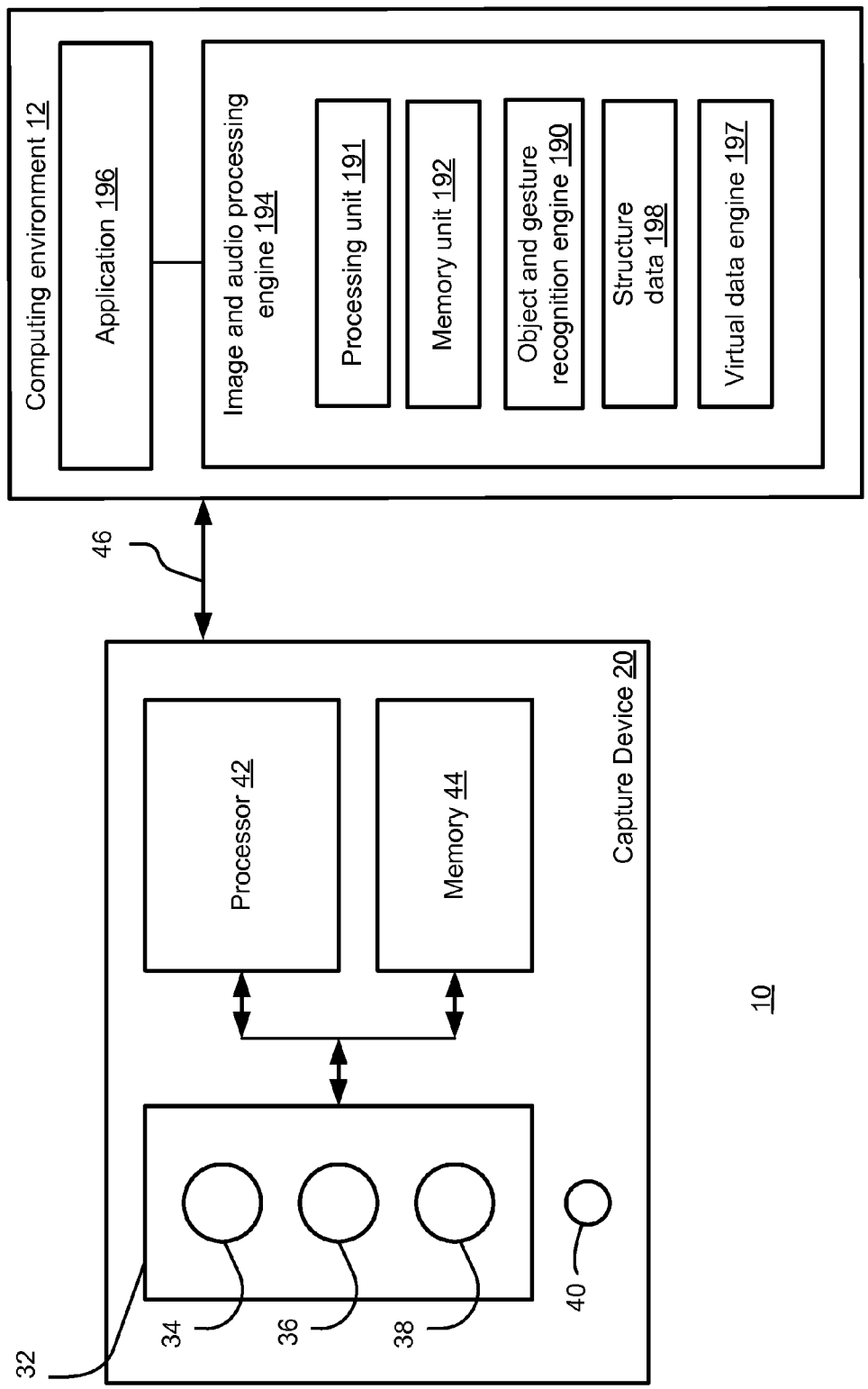
FIG. 2 depicts one embodiment of a portion of an interactive computing system.

FIG. 2 depicts one embodiment of a portion of an interactive computing system 10 including a capture device 20 and computing environment 12. In some embodiments, capture device 20 and computing environment 12 may be integrated within a single computing device.

In one embodiment, the capture device 20 may include one or more image sensors for capturing images and videos. An image sensor may comprise a CCD image sensor or a CMOS image sensor. In some embodiments, capture device 20 may include an IR CMOS image sensor. The capture device 20 may also include a depth sensor (or depth sensing camera) configured to capture video with depth information including a depth image that may include depth values via any suitable technique including, for example, time-of-flight, structured light, stereo image, or the like.

The capture device 20 may include an image camera component 32. In one embodiment, the image camera component 32 may include a depth camera that may capture a depth image of a scene. The depth image may include a two-dimensional (2D) pixel area of the captured scene where each pixel in the 2D pixel area may represent a depth value such as a distance in, for example, centimeters, millimeters, or the like of an object in the captured scene from the image camera component 32.

The image camera component 32 may include an IR light component 34, a three-dimensional (3D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more objects in the capture area using, for example, the 3D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the one or more objects in the capture area. Additionally, the phase of the outgoing light wave may be compared to the phase of the incoming light wave to determine a phase shift. The phase shift may then be used to determine a physical distance from the capture device to a particular location associated with the one or more objects.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more objects (or targets) in the capture area, the pattern may become deformed in response. Such a deformation of the pattern may be captured by, for example, the 3-D camera 36 and/or the RGB camera 38 and analyzed to determine a physical distance from the capture device to a particular location on the one or more objects. Capture device 20 may include optics for producing collimated light. In some embodiments, a laser projector may be used to create a structured light pattern. The light projector may include a laser, laser diode, and/or LED.

In some embodiments, two or more different cameras may be incorporated into an integrated capture device. For example, a depth camera and a video camera (e.g., an RGB video camera) may be incorporated into a common capture device. In some embodiments, two or more separate capture devices of the same or differing types may be cooperatively used. For example, a depth camera and a separate video camera may be used, two video cameras may be used, two depth cameras may be used, two RGB cameras may be used, or any combination and number of cameras may be used. In one embodiment, the capture device 20 may include two or more physically separated cameras that may view a capture area from different angles to obtain visual stereo data that may be resolved to generate depth information. In one example, stereo vision depth sensing techniques may be applied to images captured from a plurality of IR sensors. Depth may also be determined by capturing images using a plurality of detectors that may be monochromatic, infrared, RGB, or any other type of detector and performing a parallax calculation. Other types of depth image sensors can also be used to create a depth image.

As depicted in FIG. 2, capture device 20 may include one or more microphones 40. Each of the one or more microphones 40 may include a transducer or sensor that may receive and convert sound into an electrical signal. The one or more microphones may comprise a microphone array in which the one or more microphones may be arranged in a predetermined layout.

The capture device 20 may include a processor 42 that may be in operative communication with the image camera component 32. The processor 42 may include a standardized processor, a specialized processor, a microprocessor, or the like. The processor 42 may execute instructions that may include instructions for storing filters or profiles, receiving and analyzing images, determining whether a particular situation has occurred, or any other suitable instructions. It is to be understood that at least some image analysis and/or target analysis and tracking operations may be executed by processors contained within one or more capture devices such as capture device 20.

The capture device 20 may include a memory 44 that may store the instructions that may be executed by the processor 42, images or frames of images captured by the 3D camera or RGB camera, filters or profiles, or any other suitable information, images, or the like. In one example, the memory 44 may include random access memory (RAM), read only memory (ROM), cache, Flash memory, a hard disk, or any other suitable storage component. As depicted, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 20 may be housed in a single housing.

The capture device 20 may be in communication with the computing environment 12 via a communication link 46. The communication link 46 may be a wired connection including, for example, a USB connection, a FireWire connection, an Ethernet cable connection, or the like and/or a wireless connection such as a wireless 802.11b, g, a, or n connection. The computing environment 12 may provide a clock to the capture device 20 that may be used to determine when to capture, for example, a scene via the communication link 46. In one embodiment, the capture device 20 may provide the images captured by, for example, the 3D camera 36 and/or the RGB camera 38 to the computing environment 12 via the communication link 46.

As depicted in FIG. 2, computing environment 12 includes image and audio processing engine 194 in communication with application 196. Application 196 may comprise an operating system application or other computing application such as a gaming application. Image and audio processing engine 194 includes virtual data engine 197, object and gesture recognition engine 190, structure data 198, processing unit 191, and memory unit 192, all in communication with each other. Image and audio processing engine 194 processes video, image, and audio data received from capture device 20. To assist in the detection and/or tracking of objects, image and audio processing engine 194 may utilize structure data 198 and object and gesture recognition engine 190. Virtual data engine 197 processes virtual objects and registers the position and orientation of virtual objects in relation to various maps of a real-world environment stored in memory unit 192.

Processing unit 191 may include one or more processors for executing object, facial, and voice recognition algorithms. In one embodiment, image and audio processing engine 194 may apply object recognition and facial recognition techniques to image or video data. For example, object recognition may be used to detect particular objects (e.g., soccer balls, cars, people, or landmarks) and facial recognition may be used to detect the face of a particular person. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192. Processing unit 191 may execute computer readable instructions stored in memory unit 192 in order to perform processes discussed herein.

The image and audio processing engine 194 may utilize structural data 198 while performing object recognition. Structure data 198 may include structural information about targets and/or objects to be tracked. For example, a skeletal model of a human may be stored to help recognize body parts. In another example, structure data 198 may include structural information regarding one or more inanimate objects in order to help recognize the one or more inanimate objects.

The image and audio processing engine 194 may also utilize object and gesture recognition engine 190 while performing gesture recognition. In one example, object and gesture recognition engine 190 may include a collection of gesture filters, each comprising information concerning a gesture that may be performed by a skeletal model. The object and gesture recognition engine 190 may compare the data captured by capture device 20 in the form of the skeletal model and movements associated with it to the gesture filters in a gesture library to identify when a user (as represented by the skeletal model) has performed one or more gestures. In one example, image and audio processing engine 194 may use the object and gesture recognition engine 190 to help interpret movements of a skeletal model and to detect the performance of a particular gesture.

In some embodiments, one or more objects being tracked may be augmented with one or more markers such as an IR retroreflective marker to improve object detection and/or tracking. Planar reference images, coded AR markers, QR codes, and/or bar codes may also be used to improve object detection and/or tracking. Upon detection of one or more objects and/or gestures, image and audio processing engine 194 may report to application 196 an identification of each object or gesture detected and a corresponding position and/or orientation if applicable.

More information about detecting and tracking objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about object and gesture recognition engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

Figure 3A:
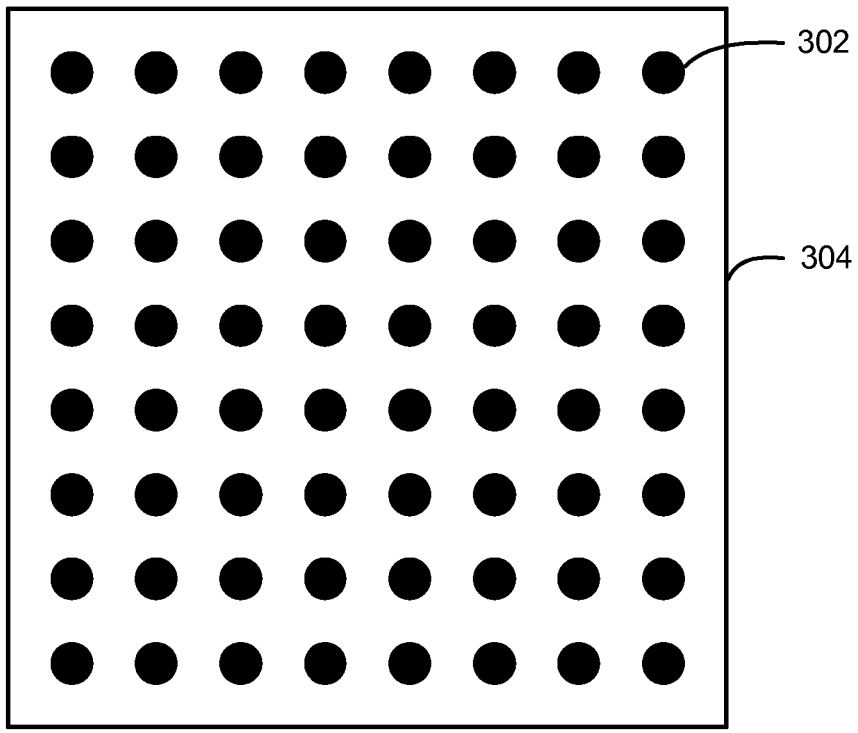
FIG. 3A depicts one embodiment of an optical target including a rectilinear grid of circles.

FIG. 3A depicts one embodiment of an optical target 304 including a rectilinear grid of circles. Each circle 302 of the rectilinear grid of circles may be separated from neighboring circles by a fixed distance (or feature spacing). In some embodiments, centroids for one or more circles of the rectilinear grid of circles may be determined by determining a center of mass for each circle or by determining an average X and average Y coordinate for each circle. In some cases, non-rectilinear grids may also be used (e.g., a triangular grid, a pentagon grid, or a hexagon grid). Although a grid of circles is depicted, an optical target may also include other symmetrical shapes including triangles, squares, pentagons, and hexagons. An optical target that uses larger symmetrical shapes may increase the precision at which the centroid locations are determined, however, the use of fewer symmetrical shapes (or matching feature points) displayed on the optical target may reduce the quality of image registration.

In one embodiment, the optical target may comprise a uniform grid of black circles on a white background that is placed at a predetermined distance from a camera or array of cameras (i.e., the camera-target displacement). In some cases, a camera may be calibrated using an optical target that is positioned at a depth below, outside, or well outside the depth of focus of the camera. In some cases, the camera-target displacement may be between 100 mm and 500 mm. Although a symmetrical shape of the optical target may not be completely in focus, a determination of the symmetrical shape's centroid or geometric center may be robust to variations in focus or distance from the camera.

Figure 3B:
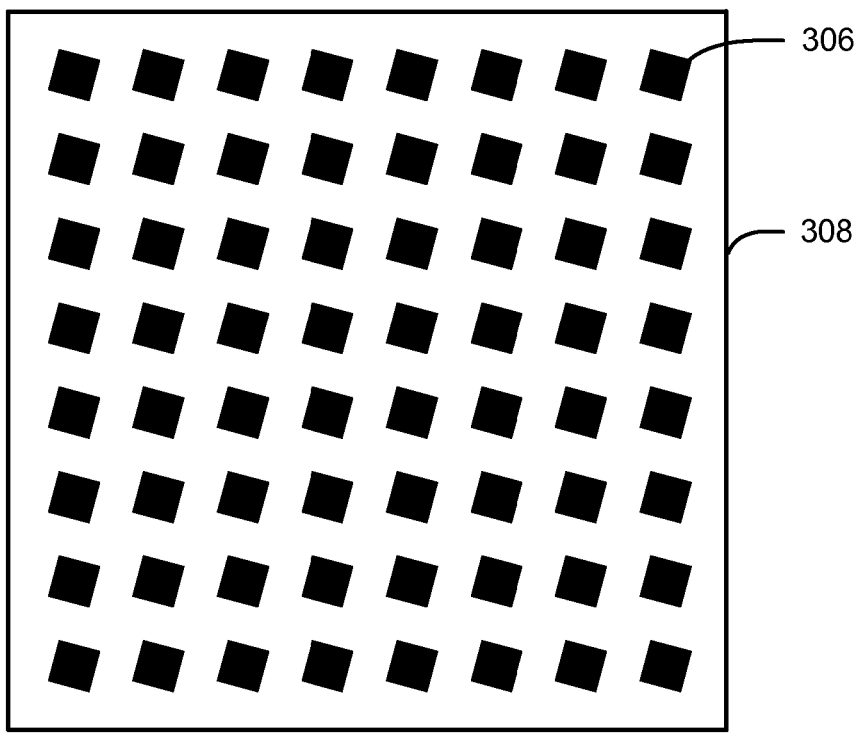
FIG. 3B depicts one embodiment of an optical target including a rectilinear grid of squares.

FIG. 3B depicts one embodiment of an optical target 308 including a rectilinear grid of squares. The center of each square 306 of the rectilinear grid of squares may be separated from neighboring squares by a fixed distance (or feature spacing). In some cases, each square 306 may be tilted or rotated around its center. In one example, each tilted square may be rotated by seven degrees around its center. The tilting of a symmetrical shape may allow the optical target to be used both during camera calibration and during a spectral frequency response test for measuring the quality of an image captured using a camera.

Figure 3C:
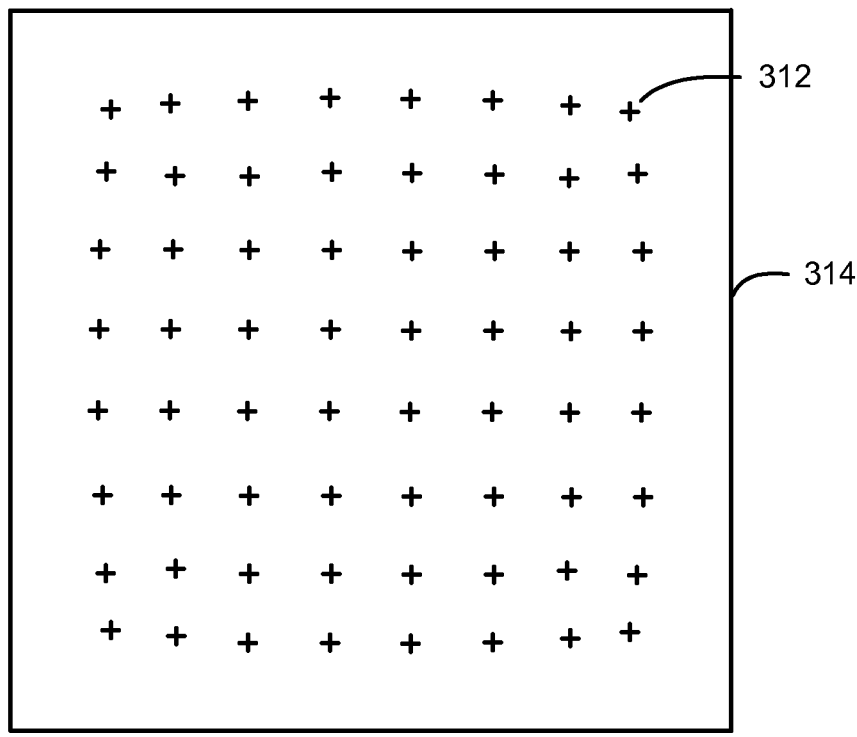
FIG. 3C depicts one embodiment of a distorted image.

FIG. 3C depicts one embodiment of a distorted image 314 that includes identifications of centroid locations corresponding with the rectilinear grid of circles used with optical target 304 in FIG. 3A. As depicted, the locations of the centroids have been distorted due to traversal through a camera lens or optical system. In some embodiments, arbitrary distortion patterns may be calibrated via adjustment of one or more distortion equations being optimized.

Figure 3D:
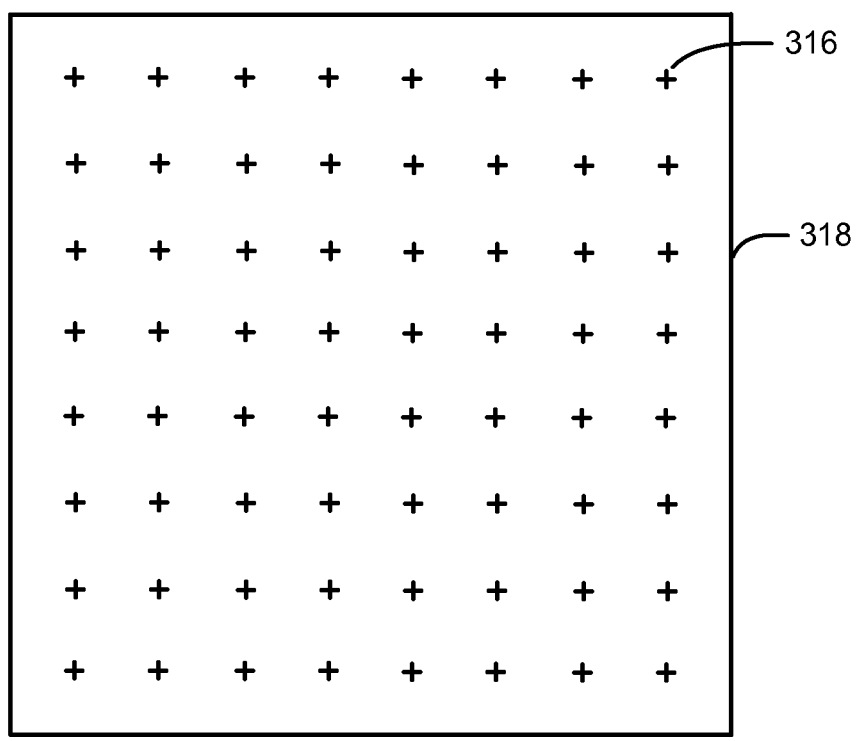
FIG. 3D depicts one embodiment of an undistorted image.

FIG. 3D depicts one embodiment of an undistorted image 318 that has been undistorted based on the application of a distortion filter using camera distortion parameters associated with a camera (or other image capture system). The camera distortion parameters may comprise radial distortion coefficients and/or tangential distortion coefficients. In some cases, distortion functions of arbitrary complexity may be used with the trade-off that a larger number of parameters may increase the time it takes to converge to a solution. The camera distortion parameters may be determined by optimizing one or more distortion polynomials such that a polynomial fit corresponding to the image distortion of the camera lens is produced. In one embodiment, the distortion filter may use an even-order radial distortion polynomial. The optimization may utilize a cost function that evaluates the straightness of lines intersecting rows and columns associated with centroid locations. As depicted, the centroid location 312 in FIG. 3C has been moved to centroid location 316 in FIG. 3D. In some cases, an undistorted image may be used to determine a feature spacing or an average feature spacing between symmetrical shapes based on the identification of centroid locations within the undistorted image.

Figure 3E:
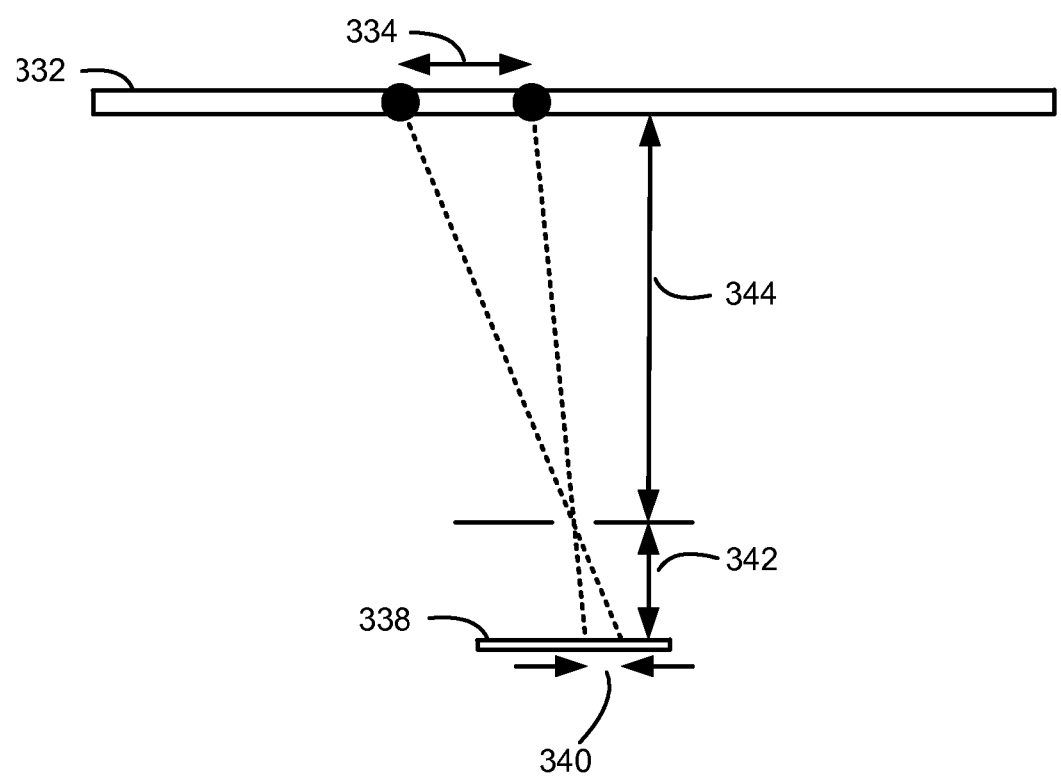
FIG. 3E depicts one embodiment of a method for determining a focal length based on feature spacing.

FIG. 3E depicts one embodiment of a method for determining a focal length based on feature spacing (e.g., based on the spacing between corresponding centroid locations). The feature spacing may be determined based on an undistorted image. As depicted, an optical target 332 includes two symmetrical shapes separated by a feature spacing 334. The optical target 332 is positioned at a target depth 344 (or camera-target displacement) from a camera that includes an image sensor 338. The image sensor 338 may capture an image of the optical target 332, which may be used to determine the observed feature spacing 340 on the image sensor 338. Assuming a simple pinhole camera model, the focal length 342 may be calculated by multiplying the target depth 344 by the ratio of the observed feature spacing 340 divided by the feature spacing 334 used with the optical target.

FIGS. 4A-4B depict one embodiment of an arrangement for calibrating and/or registering a plurality of cameras 404 using a single optical target 402. In some embodiments, in order to save space on a production floor, the target depth or distance between the optical target 402 and the plurality of cameras 404 may be outside (or well outside) the depth of focus associated with one or more of the plurality of cameras 404. The plurality of cameras 404 may be arranged such that each camera has an overlapping field of view with an adjacent camera. The plurality of cameras 404 may comprise a camera array or a plurality of image sensors in a fixed arrangement. In one example, the plurality of cameras 404 may comprise 16 RGB camera and depth camera pairs.

Figure 5A:
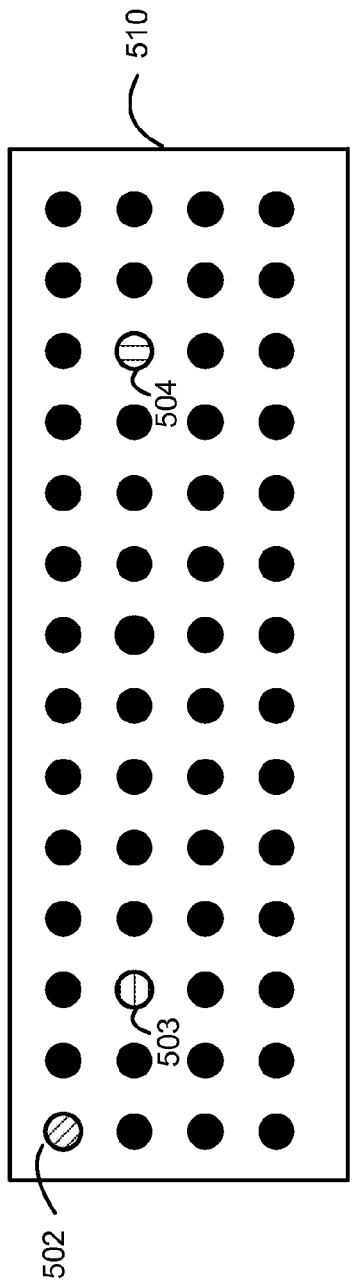
FIG. 5A depicts one embodiment of an optical target including fiducial markers.

FIG. 5A depicts one embodiment of an optical target 510 including fiducial markers 502-504. The fiducial markers 502-504 may be used to align images captured by a first camera with images captured by a second camera. In some embodiments, the fiducial markers may comprise symmetrical shapes of varying colors, shapes, and/or sizes. As depicted, the fiducial markers 502-504 are the same shape as the other symmetrical shapes used with optical target 510, but comprise a different fill pattern (i.e., they are filled with patterned lines rather than a solid fill). In one example, an optical target may include a plurality of symmetrical shapes and fiducial markers may be embedded within the plurality of symmetrical shapes by varying the color of a subset of the plurality of symmetrical shapes.

Figure 5B:
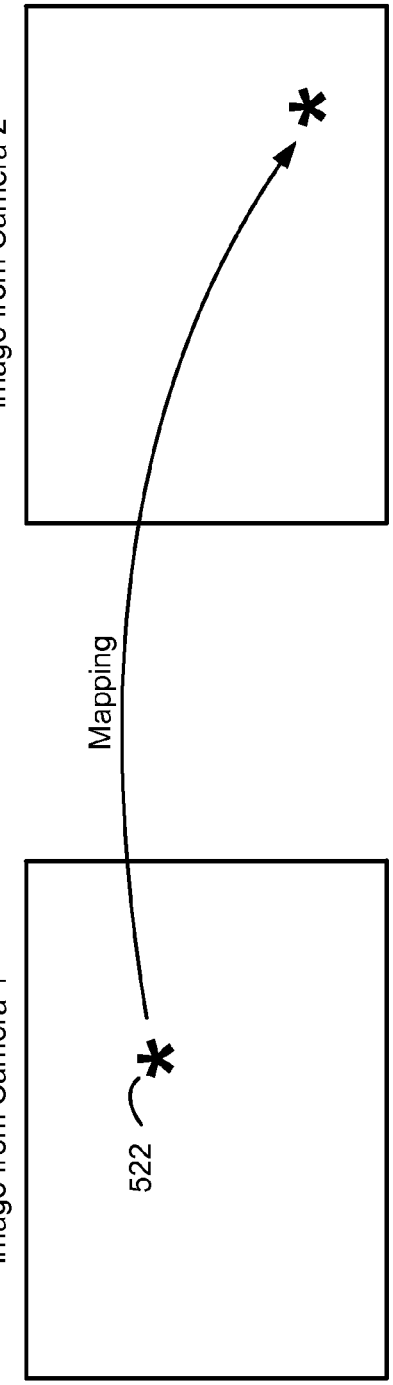
FIG. 5B depicts one embodiment of a registration mapping technique.

FIG. 5B depicts one embodiment of a registration mapping. As depicted, a first image from a first camera may be registered with a second image from a second camera by mapping feature points identified in the first image, such as feature point 522, with corresponding feature points identified in the second image. The first camera may comprise a color camera (e.g., an RGB camera) and the second camera may comprise a depth camera. In some embodiments, the registration of a color camera with a depth camera may include only calibrating the depth camera to correct for distortions associated with the depth camera and then determining a registration mapping for mapping feature points (e.g., centroids) identified within a first color image captured by the color camera with corresponding feature points identified within an undistorted intensity image captured by the depth camera. In this case, color camera distortions may be compensated for using the registration mapping.

Figure 6A:
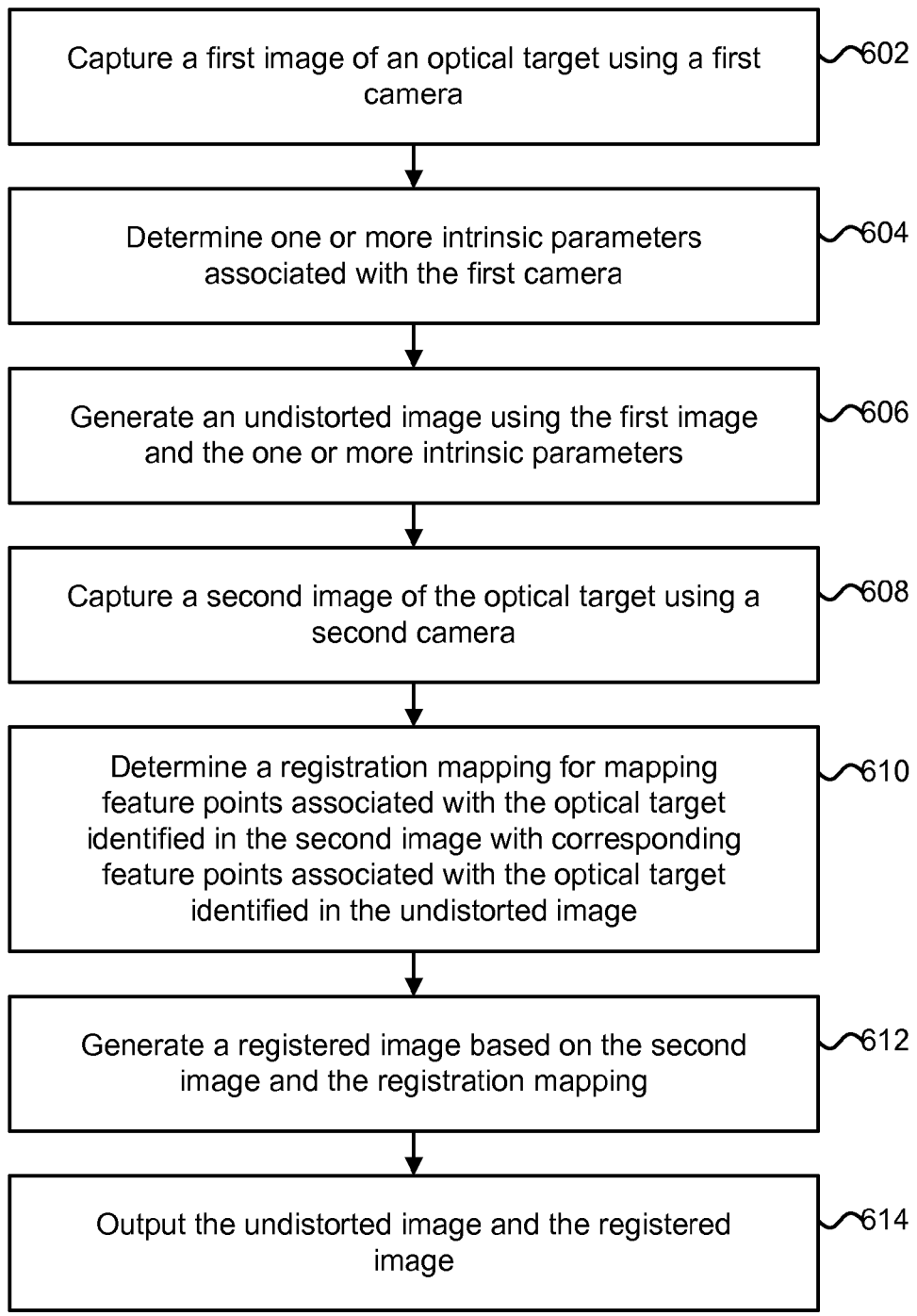
FIG. 6A is a flowchart describing one embodiment of a method for determining intrinsic parameters associated with a camera and for registering the camera with a second camera.

FIG. 6A is a flowchart describing one embodiment of a method for determining intrinsic parameters associated with a camera and for registering the camera with a second camera. In one embodiment, the process of FIG. 6A may be performed by a computing environment, such as computing environment 12 in FIG. 1.

In step 602, a first image of an optical target is captured using a first camera. The first camera may comprise a depth camera or a color camera. In one embodiment, the optical target may comprise a plurality of symmetrical shapes. The plurality of symmetrical shapes may be arranged in a grid pattern. In one example, the plurality of symmetrical shapes may comprise a rectilinear grid of circles. Each of the symmetrical shapes of the plurality of symmetrical shapes may be separated from neighboring symmetrical shapes by a feature distance or spacing. In other cases, the plurality of symmetrical shapes may include symmetrical shapes including triangles, squares, pentagons, and hexagons. In one embodiment, the optical target may include a rectilinear grid of squares that are tilted or rotated around their centers. In one example, each tilted square may be rotated by seven degrees around its center. The tilting of a symmetrical shape may allow an optical target to be used both during camera calibration and during a spectral frequency response test for measuring the quality of an image captured using a camera.

In step 604, one or more intrinsic parameters associated with the first camera are determined. The intrinsic parameters may include focal length, principal point, camera rotation parameters, and camera distortion parameters associated with the first camera. The camera distortion parameters may include radial distortion parameters and/or tangential distortion parameters. The intrinsic parameters for the first camera may be determined using an iterative optimization process. The distortion parameters may be determined by optimizing one or more distortion equations (e.g., an even-order radial distortion polynomial) such that distortions caused by the first camera are reduced or minimized. The optimization may utilize a cost function that evaluates the straightness of lines intersecting rows and columns associated with centroids of symmetrical shapes displayed on the optical target. One embodiment of a process for determining one or more intrinsic parameters associated with a camera is described later in reference to FIG. 6B.

In step 606, an undistorted image is generated using the first image and the one or more intrinsic parameters. In some cases, the undistorted image may be used to determine a feature spacing or an average feature spacing between symmetrical shapes located on the optical target. In step 608, a second image of the optical target is captured using a second camera. The second camera may comprise a depth camera or a color camera.

In step 610, a registration mapping is determined for mapping feature points associated with the optical target identified in the second image with corresponding feature points associated with the optical target identified in the undistorted image. In one embodiment, the first camera comprises a depth camera and the second camera comprises a color camera. The registration of the color camera with the depth camera may include determining a registration mapping for mapping centroids identified within the second image with corresponding centroids identified within the first image (or an undistorted intensity image associated with the first image). The registration mapping may correspond with a plurality of registration mapping coefficients. One embodiment of a process for determining a registration mapping is described later in reference to FIG. 6D.

In step 612, a registered image is generated using the second image and the registration mapping. In step 614, the undistorted image and the registered image are outputted. In some cases, the undistorted image and the registered image may be used by various computer vision applications including gesture recognition, object recognition, 3D scene reconstruction, and image based rendering applications. In one embodiment, the undistorted image and/or the registered image may be displayed.

In some embodiments, the registration mapping may be applied over an entire 3D observation volume captured by a camera array by making adjustments in one or more registration mapping coefficients based on depth information captured by the camera array. In one example, the camera array may include a depth camera and a color camera (e.g., an RGB camera). The depth camera may be used to acquire depth information associated with an environment (e.g., as depth values associated with distances to objects within the environment). The one or more registration mapping coefficients may be adjusted based on the depth information. By adjusting the one or more registration mapping coefficients based on depth information, the one or more registration mapping coefficients may be used to extend the registration mapping to a plurality of depth planes associated with the environment and extend the registration mapping beyond the calibration plane.

In one embodiment, a camera array may be calibrated at a camera-target displacement of 500 mm and 20 registration mapping coefficients corresponding with a registration mapping between two cameras of the camera array may be determined. For an object located at an object depth different from 500 mm from the camera array (i.e., the object is shallower or deeper than the 500 mm calibration distance), one or more of the 20 registration mapping coefficients may be adjusted based on the object depth. This adjustment may result in image pixels associated with a first camera of the two cameras being shifted by a constant pixel distance (or number of pixels) that is a function of the object depth. In one example, pixels associated with an image captured by the first camera corresponding with the object depth may be shifted by a first number of pixels in the X direction and a second number of pixels in the Y direction. The degree of pixel shifting in the X direction may correspond with a first registration mapping coefficient and the degree of pixel shifting in the Y direction may correspond with a second registration mapping coefficient. In some cases, the two cameras of the camera array may be arranged such that pixel shifting only occurs in one dimension (e.g., in the X direction or Y direction).

Figure 6B:
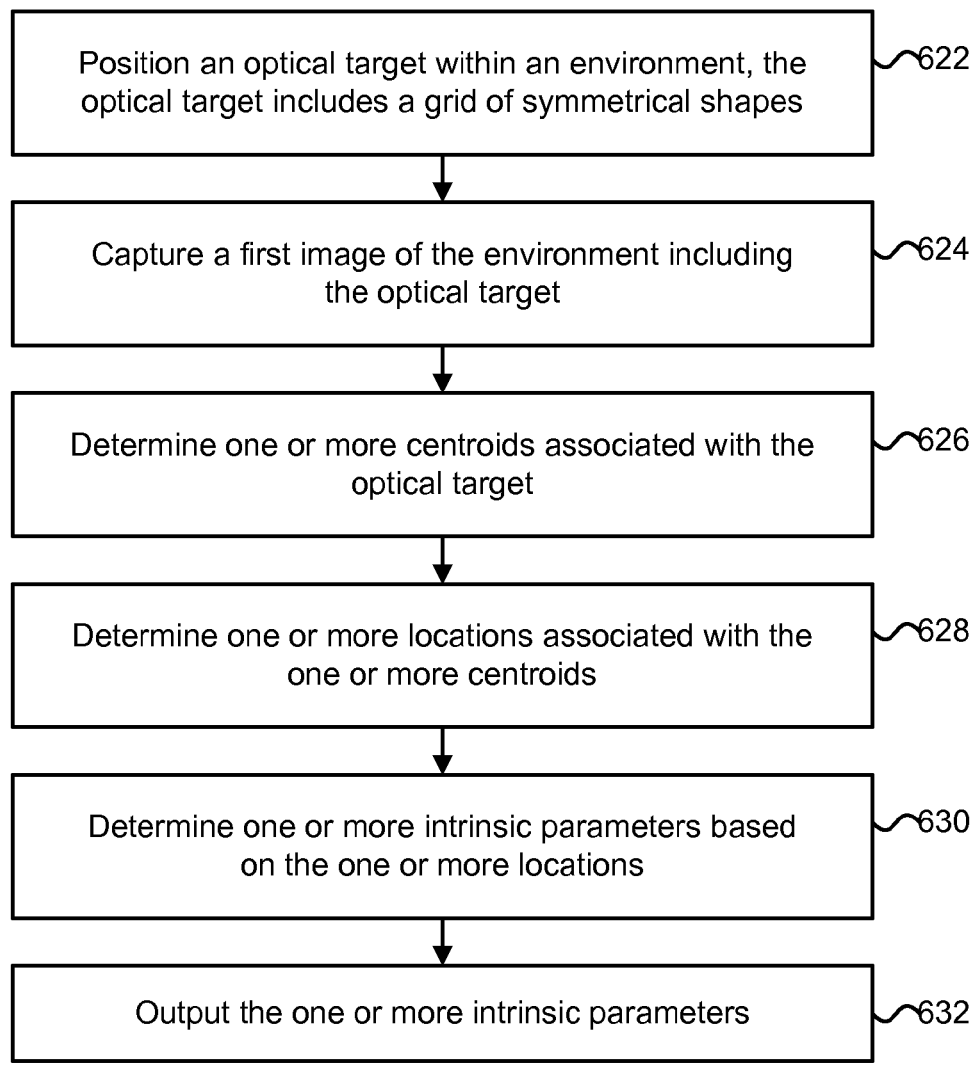
FIG. 6B is a flowchart describing one embodiment of a process for determining one or more intrinsic parameters associated with a camera.

FIG. 6B is a flowchart describing one embodiment of a process for determining one or more intrinsic parameters associated with a camera. The process described in FIG. 6B is one example of a process for implementing step 604 in FIG. 6A. In one embodiment, the process of FIG. 6B may be performed by a computing environment, such as computing environment 12 in FIG. 1.

In step 622, an optical target is positioned within an environment. The environment may comprise a production floor for calibrating and registering camera arrays. The optical target may include a grid of symmetrical shapes. In one example, the grid of symmetrical shapes may comprise a rectilinear grid of circles. In some embodiments, the optical target may be positioned at a target depth or distance from a camera that is less than a focal distance associated with the camera.

In step 624, a first image of the environment is captured including the optical target. The first image may be captured using various cameras including a depth camera, an IR camera, or an RGB camera. In step 626, one or more centroids associated with the optical target are determined. In one embodiment, shapes displayed on the optical target are identified and a center of mass (e.g., a mean X, mean Y coordinate) for each shape is determined individually. In some embodiments, the first image may be thresholded and then the one or more centroids may be determined by calculating an average X location and an average Y location for each shape displayed on the optical target.

In step 628, one or more locations associated with the one or more centroids are determined. Each of the one or more locations may correspond with a particular pixel location associated with the first image. In step 630, one or more intrinsic parameters are determined based on the one or more locations. One embodiment of a process for determining one or more intrinsic parameters based on centroid locations is described later in reference to FIG. 6C. In step 632, the one or more intrinsic parameters are outputted.

Figure 6C:
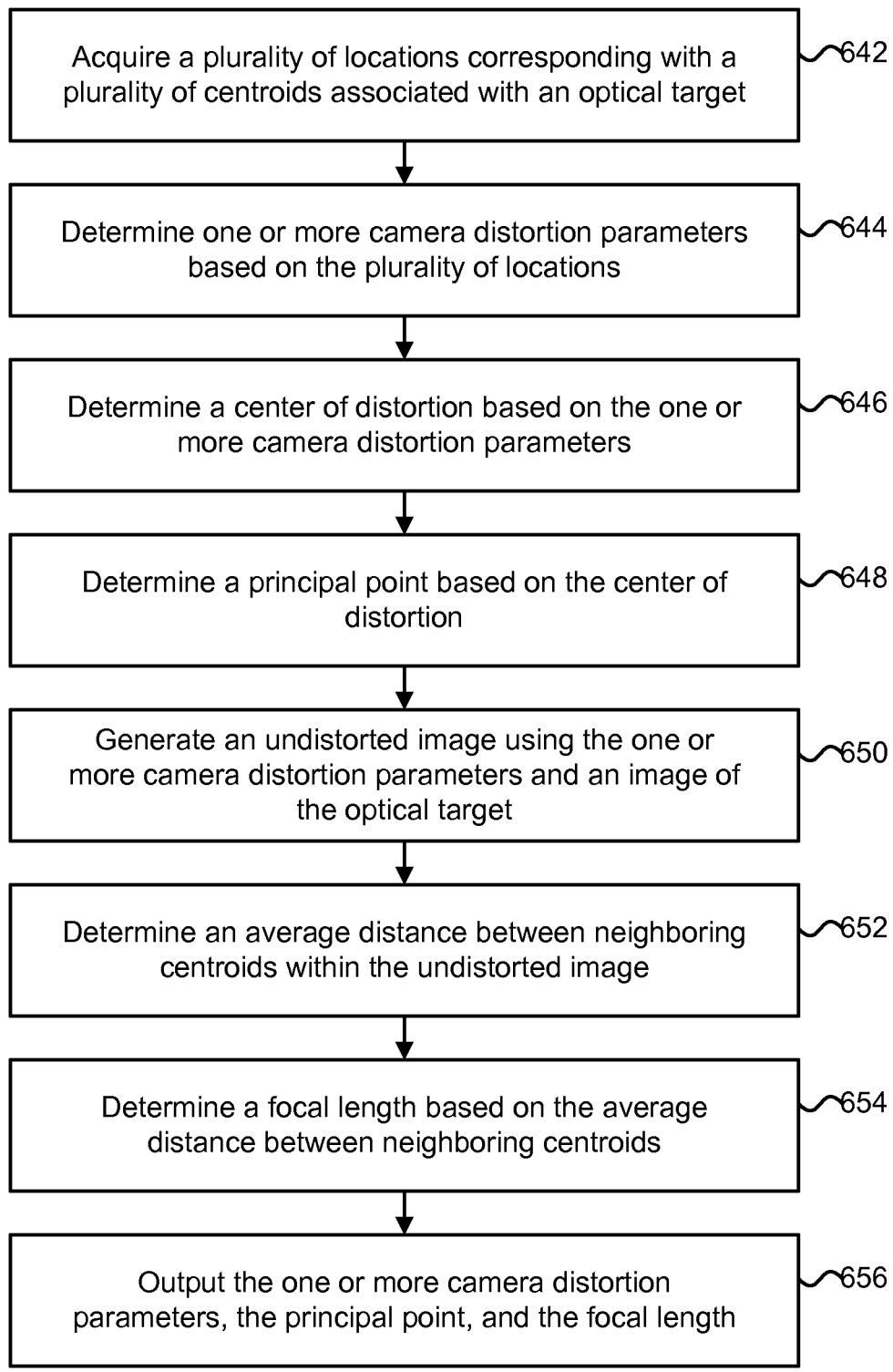
FIG. 6C is a flowchart describing one embodiment of a process for determining one or more intrinsic parameters based on centroid locations.

FIG. 6C is a flowchart describing one embodiment of a process for determining one or more intrinsic parameters based on centroid locations. The process described in FIG. 6C is one example of a process for implementing step 630 in FIG. 6B. In one embodiment, the process of FIG. 6C may be performed by a computing environment, such as computing environment 12 in FIG. 1.

In step 642, a plurality of locations corresponding with a plurality of centroids associated with an optical target are acquired. Each of the plurality of locations may be associated with a pixel location within an image of the optical target corresponding with a centroid of a shape displayed on the optical target. In step 644, one or more camera distortion parameters are determined based on the plurality of locations. The one or more camera distortion parameters may include radial distortion parameters and/or tangential distortion parameters. Although camera distortion may be irregular, it may be common for the camera distortion to be radially symmetric (e.g., due to the symmetry of a camera lens).

In some embodiment, the one or more distortion parameters may be determined by optimizing one or more distortion equations (e.g., an even-order radial distortion polynomial) such that distortions caused by a camera are reduced. The optimization may utilize a cost function that evaluates the straightness of lines intersecting rows and columns associated with centroids of symmetrical shapes displayed on the optical target. In one embodiment, the symmetrical shapes may include a uniform grid of black circles.

In step 646, a center of distortion is determined based on the one or more camera distortion parameters. In some cases, the center of distortion may correspond with a center of expansion from which points within an image undergo radial expansion. In step 648, a principal point is determined based on the center of distortion. The principal point may correspond with the optical center pixel on an image sensor, such as image sensor 338 in FIG. 3E. In step 650, an undistorted image is generated using the one or more camera distortion parameters and an image of the optical target. The undistorted image may be generated by applying a distortion filter using the one or more camera distortion parameters to the image of the optical target.

In step 652, an average distance between neighboring centroids within the undistorted image is determined. In one embodiment, a histogram of centroid to neighboring centroid distances may be computed and the median value used as the average distance. In some cases, centroids that are located along an edge or border of a centroid grid may be discarded when computing the average distance.

In step 654, a focal length is determined based on the average distance between neighboring centroids. In one embodiment, the focal length may be calculated by multiplying a target depth (or camera-target displacement) by the average distance between neighboring centroids divided by the known feature spacing used when designing the optical target. In step 656, the one or more camera distortion parameters, the principal point, and the focal length are outputted.

Figure 6D:
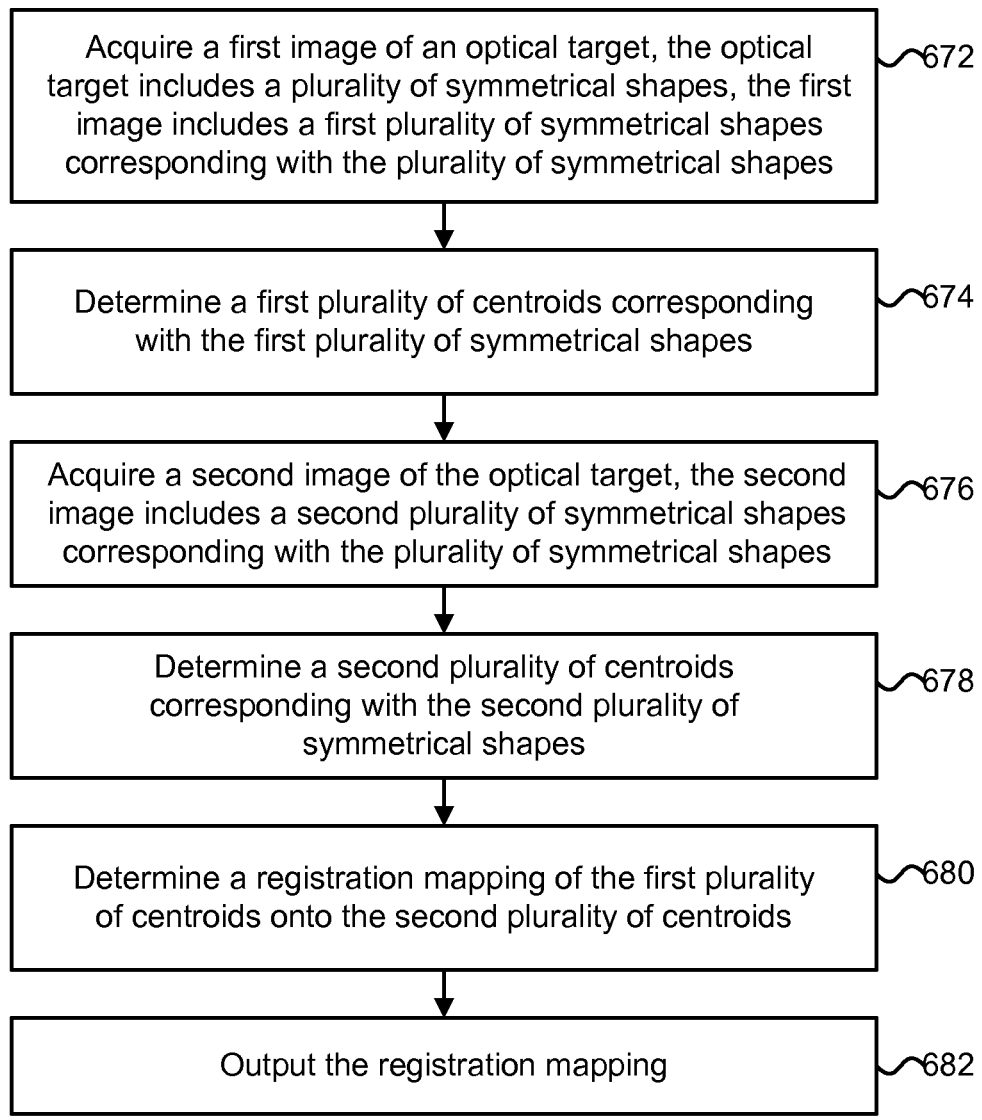
FIG. 6D is a flowchart describing one embodiment of a process for determining a registration mapping from a first image to a second image.

FIG. 6D is a flowchart describing one embodiment of a process for determining a registration mapping from a first image to a second image. The process described in FIG. 6D is one example of a process for implementing step 610 in FIG. 6A. In one embodiment, the process of FIG. 6D may be performed by a computing environment, such as computing environment 12 in FIG. 1.

In step 672, a first image of an optical target is acquired. The optical target may include a plurality of symmetrical shapes. The plurality of symmetrical shapes may comprise a plurality of circles. The first image may include a first plurality of symmetrical shapes corresponding with the plurality of symmetrical shapes associated with the optical target. In step 674, a first plurality of centroids corresponding with the first plurality of symmetrical shapes is determined.

In step 676, a second image of the optical target is acquired. The second image may include a second plurality of symmetrical shapes corresponding with the plurality of symmetrical shapes associated with the optical target. The second image may be captured from a second camera different from the first camera. In step 678, a second plurality of centroids corresponding with the second plurality of symmetrical shapes is determined.

In step 680, a registration mapping of the first plurality of centroids onto the second plurality of centroids is determined. In some embodiments, the registration mapping may be determined by finding a mapping of pixel locations within the first image associated with the first plurality of centroids onto corresponding pixel locations within the second image associated with the second plurality of centroids. In some cases, a subset of the plurality of symmetrical shapes may comprise fiducial markers that may be used to find feature correspondences between the first plurality of centroids and the second plurality of centroids. The fiducial markers may comprise symmetrical shapes of varying colors, shapes, and/or sizes. In step 682, the registration mapping is outputted.

Figure 7:
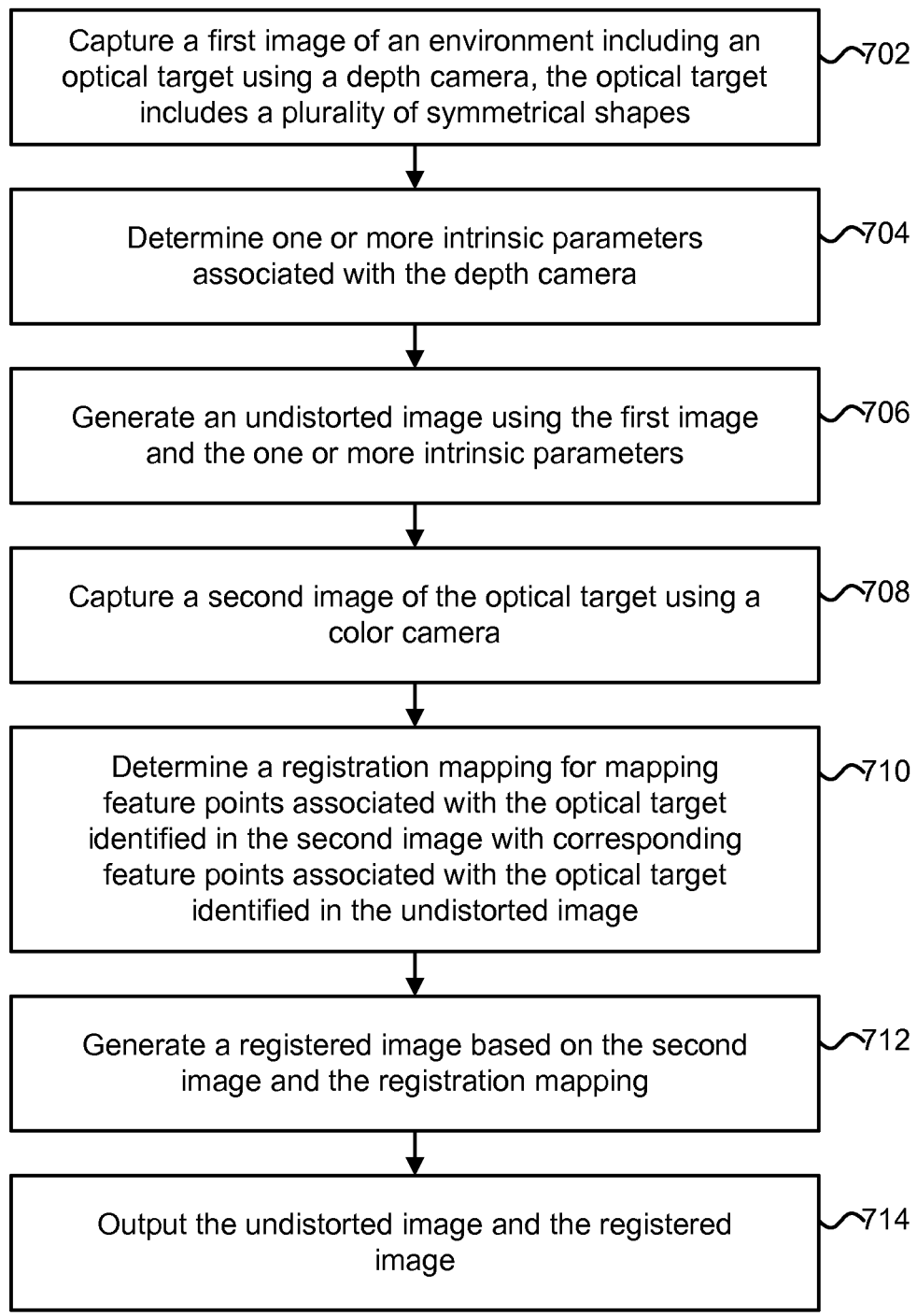
FIG. 7 is a flowchart describing an alternative embodiment of a method for determining intrinsic parameters associated with a camera and for registering the camera with a second camera.

FIG. 7 is a flowchart describing an alternative embodiment of a method for determining intrinsic parameters associated with a camera and for registering the camera with a second camera. In one embodiment, the process of FIG. 7 may be performed by a computing environment, such as computing environment 12 in FIG. 1.

In step 702, a first image of an environment including an optical target is captured using a depth camera. The optical target includes a plurality of symmetrical shapes. The environment may comprise a production floor with controlled lighting. The optical target may be positioned on the production floor such that the camera-target displacement is outside the depth of focus of the depth camera. In some cases, the camera-target displacement may be between 100 mm and 500 mm. The plurality of symmetrical shapes may be arranged in a grid pattern. In one example, the plurality of symmetrical shapes may comprise a rectilinear grid of circles. Each of the symmetrical shapes of the plurality of symmetrical shapes may be separated from neighboring symmetrical shapes by a feature distance or spacing. In other cases, the plurality of symmetrical shapes may include symmetrical shapes including triangles, squares, pentagons, and hexagons. In one embodiment, the optical target may include a rectilinear grid of squares that are tilted or rotated around their centers. In one example, each tilted square may be rotated by seven degrees around its center. The tilting of a symmetrical shape may allow an optical target to be used both during camera calibration and during a spectral frequency response test for measuring the quality of an image captured using a camera.

In step 704, one or more intrinsic parameters associated with the depth camera are determined. The one or more intrinsic parameters may include focal length, principal point, camera rotation parameters, and camera distortion parameters associated with the first camera. The camera distortion parameters may include radial distortion parameters and/or tangential distortion parameters. The one or more intrinsic parameters for the first camera may be determined using an iterative calibration process. The distortion parameters may be determined by optimizing one or more distortion equations (e.g., an even-order radial distortion polynomial) such that distortions caused by the first camera are reduced or minimized. The optimization may utilize a cost function that evaluates the straightness of lines intersecting rows and columns associated with centroids of symmetrical shapes displayed on the optical target. One embodiment of a process for determining one or more intrinsic parameters associated with a camera was described in reference to FIG. 6B.

In step 706, an undistorted image is generated using the first image and the one or more intrinsic parameters. The first image may be undistorted based on the application of a distortion filter using the distortion parameters of the one or more intrinsic parameters. In one embodiment, the first image may comprise an IR light intensity image. In some cases, the undistorted image may be used to determine a feature spacing or an average feature spacing between a subset of the plurality of symmetrical shapes located on the optical target. In step 708, a second image of the optical target is captured using a color camera. The color camera may comprise an RGB camera.

In step 710, a registration mapping is determined. The registration mapping may map feature points associated with the optical target identified in the second image with corresponding feature points associated with the optical target identified in the undistorted image. The feature points may comprise centroid locations corresponding with the plurality of symmetrical shapes. In step 712, a registered image is generated based on the second image and the registration mapping. In step 714, the undistorted image and the registered image are outputted. In some cases, the undistorted image and the registered image may be used by various computer vision applications including gesture recognition, object recognition, 3D scene reconstruction, and image based rendering applications. In one embodiment, the undistorted image and/or the registered image may be displayed.

One embodiment of the disclosed technology includes capturing a first image of an environment including an optical target using a first camera. The optical target includes a plurality of symmetrical shapes. The method further includes determining a plurality of centroid locations within the first image corresponding with the plurality of symmetrical shapes, determining one or more distortion parameters associated with the first camera based on the plurality of centroid locations, generating an undistorted image using the first image and the one or more distortion parameters, and outputting the undistorted image.

One embodiment of the disclosed technology includes a depth camera and one or more processors in communication with the depth camera. The depth camera captures a first image of an environment including an optical target. The optical target includes a plurality of symmetrical shapes. The one or more processors determine a plurality of centroid locations within the first image corresponding with the plurality of symmetrical shapes, determine one or more distortion parameters associated with the first camera based on the plurality of centroid locations, and generate an undistorted image using the first image and the one or more distortion parameters.

One embodiment of the disclosed technology includes capturing a first image of an environment including an optical target using a depth camera. The optical target includes a plurality of symmetrical shapes. The method further includes determining a plurality of centroid locations within the first image corresponding with the plurality of symmetrical shapes, determining one or more intrinsic parameters associated with the depth camera based on the plurality of centroid locations, generating an undistorted image using the first image and the one or more intrinsic parameters, capturing a second image of the optical target using a color camera, determining a registration mapping for the second image onto the undistorted image, generating a registered image using the second image and the registration mapping, and outputting the undistorted image and the registered image.

Figure 8:
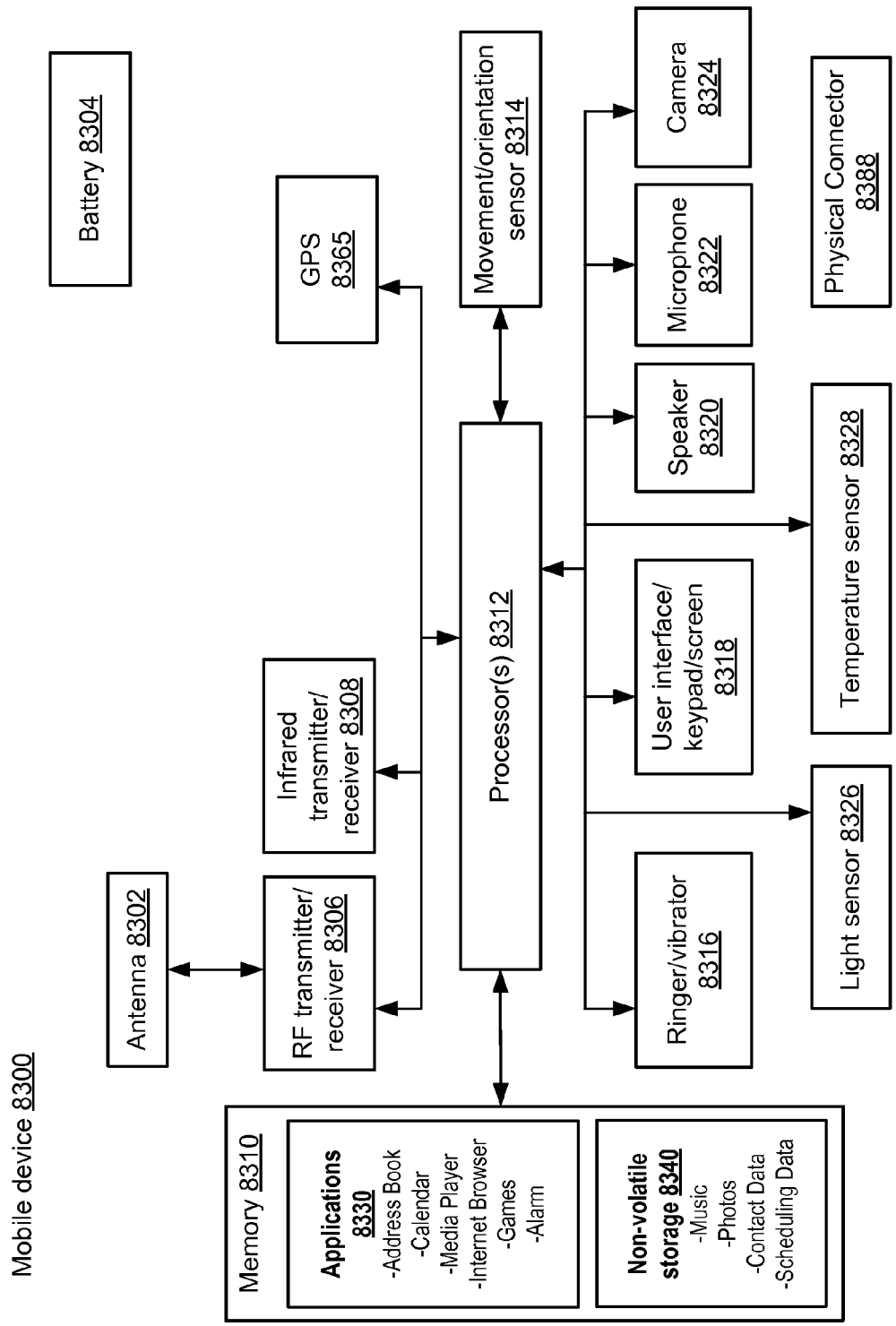
FIG. 8 is a block diagram of one embodiment of a mobile device.

The disclosed technology may be used with various computing systems. FIGS. 8-9 provide examples of various computing systems that can be used to implement embodiments of the disclosed technology.

FIG. 8 is a block diagram of one embodiment of a mobile device 8300, which may function as a computing environment, such as computing environment 12 in FIG. 1. Mobile devices may include laptop computers, pocket computers, mobile phones, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

FIG. 9 is a block diagram of an embodiment of a computing system environment 2200, such as computing environment 12 in FIG. 1. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. By way of example, and not limitation, FIG. 9 illustrates operating system 2234, application programs 2235, other program modules 2236, and program data 2237.

The computer 2210 may also include other removable/non-removable, volatile/nonvolatile computer storage media. By way of example only, FIG. 9 illustrates a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media discussed above and illustrated in FIG. 9, provide storage of computer readable instructions, data structures, program modules and other data for the computer 2210. In FIG. 9, for example, hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210, although only a memory storage device 2281 has been illustrated in FIG. 9. The logical connections depicted in FIG. 9 include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. By way of example, and not limitation, FIG. 9 illustrates remote application programs 2285 as residing on memory device 2281. It will be appreciated that the network connections shown are exemplary and other means of establishing a communications link between the computers may be used.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method for calibrating a camera array, comprising:
capturing a first image of an environment including an optical target using a first camera, the optical target includes a plurality of symmetrical shapes;
determining a plurality of centroid locations within the first image corresponding with the plurality of symmetrical shapes;

determining one or more distortion parameters associated with the first camera based on the plurality of centroid locations;
generating a reduced distortion image using the first image and the one or more distortion parameters;
outputting the reduced distortion image;
capturing a second image of the optical target using a second camera different from the first camera;
determining a registration mapping for the second image onto the reduced distortion image;
generating a registered image based on the second image and the registration mapping; and
outputting the registered image.

2. The method of claim 1, wherein:
the optical target is positioned within the environment at a depth outside a depth of focus of the first camera.

3. The method of claim 1, wherein:
the plurality of symmetrical shapes includes a plurality of circles.

4. The method of claim 1, wherein:
the determining a plurality of centroid locations includes thresholding the first image and determining a center of mass for each of the plurality of symmetrical shapes.

5. The method of claim 1, further comprising:
determining a center of distortion based on the one or more distortion parameters; and
determining a principal point based on the center of distortion.

6. The method of claim 1, further comprising:
determining an average distance between neighboring centroids within the reduced distortion image; and
determining a focal length associated with the first camera based on the average distance between neighboring centroids.

7. The method of claim 1, wherein:
the determining one or more distortion parameters associated with the first camera includes optimizing the one or more distortion parameters using a cost function that evaluates the straightness of lines intersecting rows and columns associated with the plurality of centroids.

8. The method of claim 1, further comprising:
determining depth information associated with the reduced distortion image, the first camera comprises a depth camera, the registration mapping includes one or more registration mapping coefficients; and
adjusting the one or more registration mapping coefficients based on the depth information.

9. The method of claim 1, wherein:
the outputting the reduced distortion image includes displaying the reduced distortion image;
the first camera comprises a depth camera; and
the second camera comprises a color camera.

10. A system for calibrating a camera array, comprising:
a depth camera, the depth camera to capture a first image of an environment including an optical target, the optical target includes a plurality of symmetrical shapes;
one or more processors, the one or more processors to communicate with the depth camera, the one or more processors to determine a plurality of centroid locations within the first image corresponding with the plurality of symmetrical shapes, the one or more processors to determine one or more distortion parameters associated with the depth camera based on the plurality of centroid locations, the one or more processors to generate a reduced distortion image using the first image and the one or more distortion parameters; and
a color camera to communicate with the one or more processors, the color camera to capture a second image of the environment including the optical target, the one or more processors to determine a registration mapping for the second image onto the reduced distortion image, the one or more processors to generate a registered image by applying the registration mapping to the second image.

11. The system of claim 10, wherein:
the optical target is positioned within the environment at a depth outside a depth of focus of the depth camera.

12. The system of claim 10, wherein:
the plurality of symmetrical shapes includes a plurality of circles.

13. One or more storage devices containing processor readable code for programming one or more processors to perform a method for calibrating a camera array comprising the steps of:
capturing a first image of an environment including an optical target using a depth camera, the optical target includes a plurality of symmetrical shapes;
determining a plurality of centroid locations within the first image corresponding with the plurality of symmetrical shapes;
determining one or more intrinsic parameters associated with the depth camera based on the plurality of centroid locations;
generating a reduced distortion image using the first image and the one or more intrinsic parameters;
capturing a second image of the optical target using a color camera;
determining a registration mapping for the second image onto the reduced distortion image;
generating a registered image using the second image and the registration mapping; and
outputting the reduced distortion image and the registered image.

14. The one or more storage devices of claim 13, wherein:
the optical target is positioned within the environment at a depth outside a depth of focus of the depth camera.

15. The one or more storage devices of claim 13, wherein:
the plurality of symmetrical shapes includes a plurality of circles.

16. The one or more storage devices of claim 13, wherein:
the determining a plurality of centroid locations includes thresholding the first image and determining a center of mass for each of the plurality of symmetrical shapes.

17. The one or more storage devices of claim 13, wherein:
the outputting the undistorted image and the registered image includes displaying the reduced distortion image.

18. The one or more storage devices of claim 13, further comprising:
determining an average distance between neighboring centroids within the reduced distortion image; and
determining a focal length associated with the depth camera based on the average distance between neighboring centroids.

* * * * *